Nov. 10, 1953 F. B. BRAMHALL ET AL 2,658,945

REPEATER SWITCHING SYSTEM

Filed May 31, 1951 2 Sheets-Sheet 1

INVENTORS.
F. B. BRAMHALL
E. L. NEWELL
P. H. WELLS
C. H. CRAMER

BY M J Reynolds
ATTORNEY

Nov. 10, 1953 F. B. BRAMHALL ET AL 2,658,945

REPEATER SWITCHING SYSTEM

Filed May 31, 1951 2 Sheets-Sheet 2

INVENTORS.
F. B. BRAMHALL
E. L. NEWELL
P. H. WELLS
C. H CRAMER
BY
M J Reynolds
ATTORNEY Patented Nov. 10, 1953

2,658,945

UNITED STATES PATENT OFFICE 2,658,945

REPEATER SWITCHING SYSTEM

Fay B. Bramhall, Ridgewood, Earl L. Newell and Philip H. Wells, Chatham, N. J., and Clifford H. Cramer, Great Neck, N. Y., assignors to The Western Union Telegraph Company, New York, N. Y., a corporation of New York Application May 31, 1951, Serial No. 229,191

15 Claims. (Cl. 178—70)

The present invention relates to electrical repeaters and more particularly to submersible electrical repeaters for use with submarine cables.

As indicated in copending patent application of H. F. Wilder, Serial No. 229,146, filed concurrently herewith, speed, quality and reliability of service of submarine cables can be greatly improved through the use of repeaters intermediate the shore terminals. Due to the high cost of raising and repairing a submerged repeater, it is desirable that a submerged repeater have as long a life as possible. The life of a submerged repeater can be greatly extended through the used of high quality components and, in particular, long life tubes. However, since latent defects in tubes and other circuit components can not always be detected in advance, it is desirable that a submerged repeater be supplied with spare components and that means controllable from the shore be provided for switching spare components into service.

When a submerged repeater is included in a submarine cable circuit, it is desirable that various tests, both with and without the repeater in the circuit, be available properly to maintain the submarine cable. For instance, in locating cable faults it is desirable to be able to switch the repeater out of the cable circuit. These various tests require switching apparatus located at the repeater and controllable from a shore station. For operating the cable in the reverse direction, it is also desirable to be able to switch the repeater out of the cable circuit.

Accordingly, it is an object of the invention to provide switching and control apparatus suitable for use with a submerged repeater in a submarine cable.

More specifically, it is an object of the invention to provide switching apparatus in a submerged repeater circuit and control apparatus therefor at a shore station.

Another object of the invention is to provide reliable and positive acting switching and control apparatus for a submerged repeater.

Further objects of the invention will appear from the following description.

In accordance with the invention, these objects are achieved by providing, at the submerged repeater station, multi-position switching apparatus and operating means therefor and additional apparatus for selectively placing the switching apparatus in the cable circuit and by providing, at the shore station, means for selectively operating the switching apparatus and the additional apparatus. It is desirable that the switching apparatus provide a plurality of testing and operating connections including a connection in which the cable circuit is cut through directly. In a preferred embodiment of the invention, D. C. stepping pulses operate the switching apparatus while trains of A. C. switching pulses selectively place the repeater circuit in switching and operating conditions.

Figure 1:
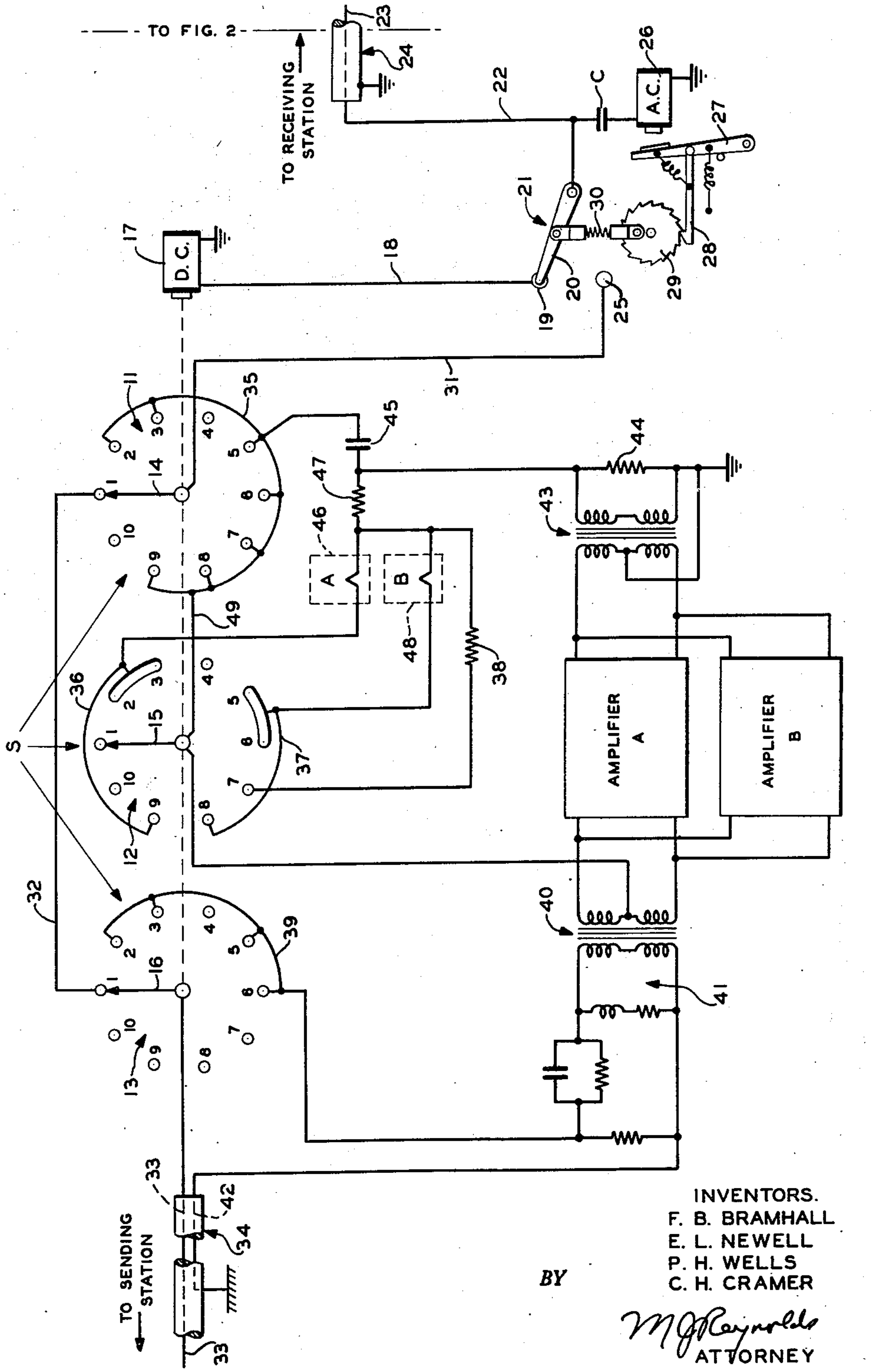
Figure 2:
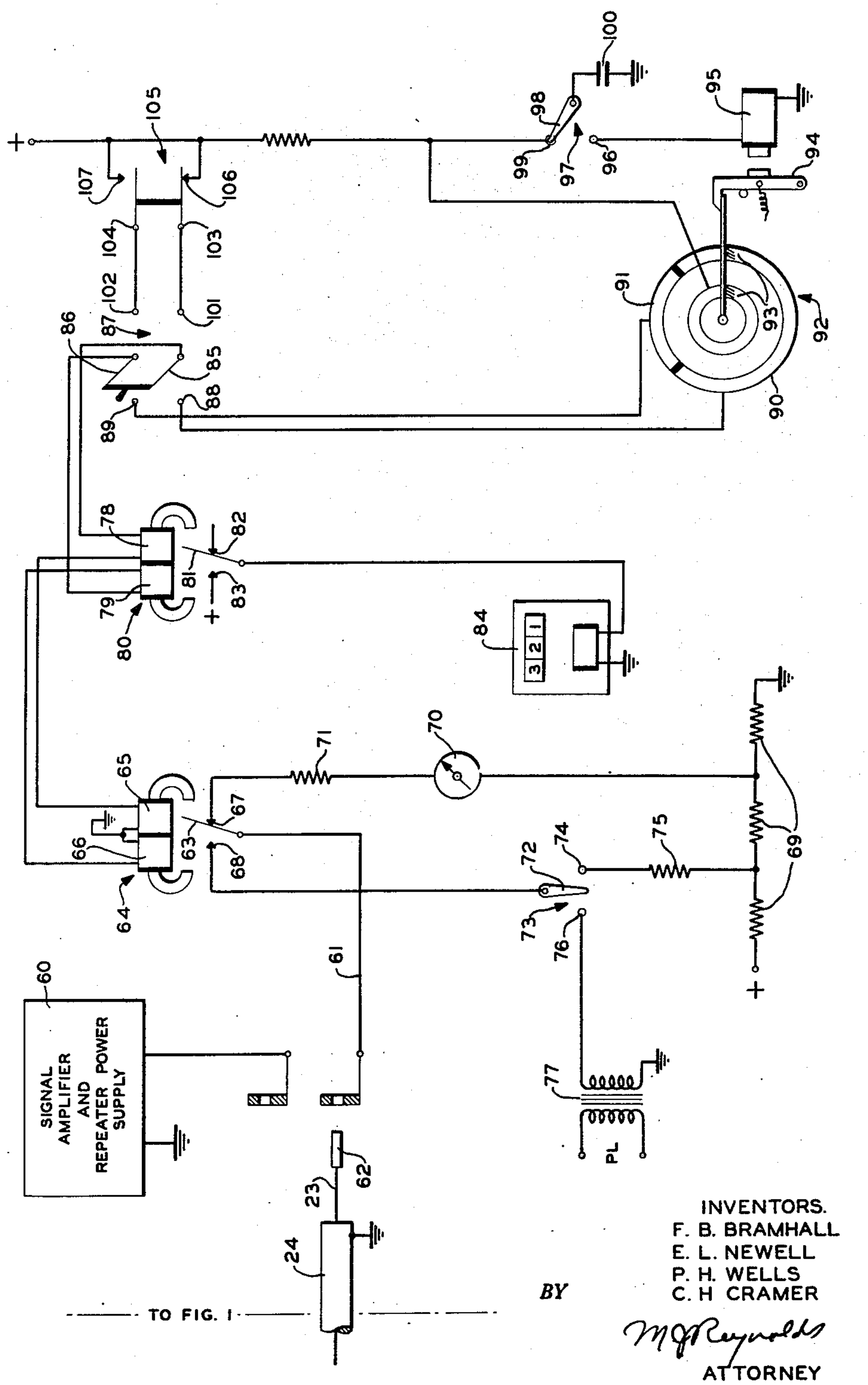

The invention will now be described in greater detail with reference to the appended drawing in which:

Fig. 1 illustrates a repeater switching circuit arrangement in accordance with the invention; and Fig. 2 illustrates control apparatus at a shore station for use with the circuit arrangement of Fig. 1.

Referring now to the drawings and more particularly to Fig. 1, there is shown a three-level rotary switch S. Levels 11, 12 and 13 of switch S each have ten contacts wiped, respectively, by wipers 14, 15 and 16. The wipers are caused to step one contact at each operation of a D. C. stepping magnet 17. Stepping magnet 17 is energized through a circuit which may be traced from ground, through the winding of magnet 17, conductor 18, front contact 19 and tongue 20 of switch 21, conductor 22, conductor 23 of cable 24, a source of direct potential at the shore station (not shown) and ground. Stepping magnet 17 is energized once for each pulse of direct current received over cable 24.

Switch 21 is caused to operate from its front contact 19 to its back contact 25 by energization of an A. C. magnet 26, the winding of which is shunted across conductor 22 and ground.

Since A. C. magnet 26 is shunted across the cable circuit, it should respond solely to A. C. switching pulses having frequencies outside the intelligence signaling frequency band. Magnet 26 should have a relatively high impedance with respect to intelligence signal frequencies and a relatively low impedance with respect to switching pulses. This is accomplished by placing a capacitor C in series with magnet 26 to form a series resonant circuit tuned to the frequency of the A. C. switching pulses. With low speed cables, A. C. magnet 26 may conveniently be caused to respond to currents of 60 cycles. Armature 27 of magnet 26 operates a ratchet 28 which, in turn, rotates a crank 29. Crank 29 is coupled to tongue 20 through a spring 30 so that rotation of crank 29 operates tongue 20 back and forth between front contact 19 and back contact 25. A predetermined number of A. C. switching pulses, for instance, fifteen, applied to magnet 26, each pulse producing one step of ratchet 28, will rotate crank 29 sufficiently to operate switch 21.

When tongue 20 is connected with front contact 19, D. C. stepping magnet 17 is connected across the cable circuit and D. C. stepping pulses may be applied thereto to cause stepping of switch S. After application of the desired number of D. C. pulses to stepping magnet 17, the predetermined number of A. C. switching pulses may be applied to magnet 26 to operate tongue 20 to back contact 25. At this time the cable circuit is connected to a conductor 31. When further stepping of switch S is desired, application of the predetermined number of A. C. switching pulses to magnet 26 will operate tongue 20 to back contact 19, connecting D. C. stepping magnet 17 to the cable circuit.

Conductor 31 is connected to wiper 14 of level 11. Stud 1 of level 11 is connected through a conductor 32 to stud 1 of level 13. Wiper 16 of level 13 is connected to conductor 33 of cable 34, so that, when the wipers are connected to the respective studs 1 of the three levels, cable conductor 23 is connected through directly to cable conductor 33.

Studs 2, 3 and 5 through 9 of level 11 are interconnected by a conductor 35, while studs 4 and 10 thereof are open. Studs 1, 4 and 10 of level 12 are open, while studs 2, 3 and 9 and 5, 6 and 8 thereof are interconnected, respectively, by conductors 36 and 37. Stud 7 of level 12 is connected to one end of a resistor 38. Studs 4 and 7 through 10 of level 13 are open, while studs 2, 3, 5 and 6 thereof are interconnected by a conductor 39.

Conductor 39 is connected to one end of the primary winding of an input transformer 40 through a shaping network 41. The other end of the primary winding of transformer 40 is connected to the cable ground through a conductor 42. The cable ground connection is carried back along the cable for a considerable distance, preferably about one-quarter mile, to avoid feedback which might result from common input and output grounds. For this purpose the section of cable 34 adjacent to the repeater station consists of a bicore cable having conductors 33 and 42. Conductor 42 is finally earthed on the cable armor wires.

The secondary winding of transformer 40 is coupled to two parallel connected repeating amplifiers A and B, which may be of any suitable type designed to operate with small power requirements. A suitable amplifier circuit is illustrated in the copending patent application of P. H. Wells et al., Serial No. 229,193, filed concurrently herewith. The center tap of the secondary winding of transformer 40 is connected to wiper 15 and to conductor 35.

The outputs of amplifiers A and B are coupled to the primary winding of an output transformer 43. One end of the secondary of transformer 43, which is shunted by a resistor 44, is connected to ground, while the other end thereof is coupled to conductor 35 through a capacitor 45.

Interconnected studs 2 and 3 of level 12 are coupled through the series connected tube heaters 46 of amplifier A and through resistors 47 and 44 to ground. Interconnected studs 5 and 6 of level 12 are coupled through the series connected tube heaters 48 of amplifier B and through resistors 47 and 44 to ground. Stud 7 of level 12 is connected through resistors 38, 47 and 44 to ground. The resistance of resistor 38 is chosen substantially equal to the operating resistance values of the amplifier tube heaters. Wiper 15 and conductor 35 are interconnected by a conductor 49.

When wipers 14, 15 and 16 are resting on the respective first studs of levels 11, 12 and 13, cable conductor 23 is directly connected with cable conductor 33, amplifiers A and B being completely out of the cable circuit. This connection is desired for making certain cable tests, for operating the cable without the repeater, for operating the cable in the reverse direction when a second repeater is installed near the other end of the cable, and for maintaining service in the event of repeater failure.

When wipers 14, 15 and 16 are resting on respective studs 2 or 3 of levels 11, 12 and 13, the cable circuit is completed through amplifier A. The signal may be traced from cable conductor 33 through wiper 16, conductor 39, shaping network 41, transformer 40, amplifier A, transformer 43, capacitor 45, conductor 35, wiper 14, conductor 31, tongue 20, and conductor 22 to cable conductor 23. The tube heating circuit for amplifier A is completed from conductor 23 through conductor 22, tongue 20, conductor 31, wiper 14, conductor 35, conductor 49, wiper 15, heaters 46, resistor 47 and resistor 44 to ground.

When wipers 14, 15 and 16 are resting on respective studs 4 or 10 of levels 11, 12 and 13, the cable circuit, as viewed from either the sending or the receiving station, is open and available for desired open cable tests.

When wipers 14, 15 and 16 are resting on respective studs 5 or 6 of levels 11, 12 and 13, the cable circuit is completed through amplifier B. It will be noted that in this connection heaters 48 of amplifier B are supplied with current rather than heaters 46.

When wipers 14, 15 and 16 are resting on respective studs 7 of levels 11, 12 and 13, the cable circuit from the sending station is open, while the cable circuit from the receiving station is completed through resistor 38 so that tests may be made from the receiving station with a resistance value substantially equal to the amplifier tube heater operating resistance.

When wipers 14, 15 and 16 are resting on respective studs 8 or 9 of levels 11, 12 and 13, the cable circuit from the sending station is open, while the cable circuit from the receiving station is completed through heaters 48 or 46, respectively. In these connections tests may be made with the amplifier inputs open and their heaters operating.

In normal operation of the submarine cable, the cable circuit will be completed through either amplifier A or B. When it is desired to shift from one to the other amplifier or to shift to one of the testing positions described hereinbefore, a predetermined number of A. C. switching pulses are transmitted from the receiving station to energize A. C. magnet 26, thereby to operate tongue 20 from back contact 25 to front contact 19. When tongue 20 is resting on contact 19, a number of D. C. stepping pulses equal to the number of studs desired to be stepped is transmitted over the cable, each stepping pulse operating stepping magnet 17 and causing wipers 14, 15 and 16 each to step one stud. After completion of the D. C. stepping, the predetermined number of A. C. switching pulses is again transmitted over the cable from the receiving station to operate tongue 20 back to contact 25. The testing and operating positions described hereinbefore are given for purposes of illustration only as other conditions could be provided. For instance, a single amplifier with various combinations of replacement tubes could be provided.

Referring now to Fig. 2, which describes receiving station apparatus for use with the arrangement of Fig. 1, cable conductor 23 may be connected either to a signal amplifier and power supply 60 or to conductor 61 by means of a plug 62. Conductor 61 is connected to an armature 63 operated by a polar relay 64 having two windings 65 and 66. When winding 65 is energized, armature 63 makes with back contact 67. When winding 66 is energized, armature 63 makes with front contact 68. Contact 67 is supplied with a positive potential from a voltage divider 69 through an ammeter 70 and a resistor 71.

Contact 68 is connected to a tongue 72 of a manual switch 73. When tongue 72 is connected to a contact 74, a positive D. C. stepping voltage is supplied to contact 68 from a tapping on voltage divider 69 through a resistor 75. When tongue 72 is connected to a contact 76, an A. C. switching voltage is applied to contact 68 from a transformer 77 coupled to a source of A. C. potential PL.

Windings 65 and 66 of relay 64 are connected in series, respectively, with windings 78 and 79 of a polar relay 80, one end of each of windings 65 and 66 being connected to ground. Energization of winding 78 causes an armature 81 to operate to an open back contact 82, while energization of winding 79 causes armature 82 to operate to a contact 83. Contact 83 is connected to a source of positive potential. Armature 81 is connected to ground through the winding of a counter 84. The dial of counter 84 is advanced one digit each time current is supplied thereto. The free ends of windings 78 and 79 are connected, respectively, to tongues 85 and 86 of a double pole double throw switch 87. Tongues 85 and 86 may connect, respectively, with contacts 88 and 89, which are connected, in turn, to segments 90 and 91 of the outer ring of a distributor 92. The inner ring of distributor 92 is connected to a source of positive potential.

In the normal unoperated position of distributor 92, brushes 93 thereof interconnect the inner ring and segment 90 of the outer ring, thereby applying positive potential to contact 88. When stop 94 is pulled back, the brushes are released and permitted to make one revolution, during the course of which brushes 93 interconnect the inner ring and segment 91 for a predetermined time interval. During this time interval positive potential is applied to contact 89. For reasons which will be set out hereinafter, this predetermined time interval is made equal to the time required for the desired predetermined number of A. C. switching pulse cycles applied to magnet 26 at the frequency of supply PL.

Stop 94 is operated by a magnet 95, the winding of which is connected between ground and a contact 96 of a push button switch 97. Tongue 98 of switch 97 is normally connected to a contact 99 coupled to a source of positive potential, thereby supplying charging current for a capacitor 100. When tongue 98 is operated to contact 96, capacitor 100 discharges through magnet 95, thereby operating stop 94 and permitting brushes 93 to rotate. After one revolution stop 94 is again interposed in the path of brushes 93. To insure that stop 94 permits only one revolution, the discharge time constant of capacitor 100 should be made relatively short.

Contacts 101 and 102 of switch 87 are connected, respectively, to tongues 103 and 104 of a switch 105. Contacts 106 and 107 of switch 105 are each connected to a source of positive potential. When switch 105 is in its upper position, contact 107 and tongue 104 are closed while contact 106 and tongue 103 are open.

The operation of the circuit arrangement of Fig. 2 will now be described. Assume that initially switch 87 is in its left hand position, switch 97 in its upper position, switch 73 in its left hand position, and plug 62 connected to conductor 61. Positive battery will be applied to series connected windings 65 and 78 through the inner ring of distributor 92 and segment 90, causing tongues 81 and 63 to make with contacts 82 and 67, respectively. Positive battery will be applied to the cable circuit through ammeter 70, the meter reading providing an indication of the switching position at the repeater. When switch 97 is moved to its lower position, brushes 93 are caused to make one revolution on distributor 92 as hereinbefore described. During the time interval that brushes 93 interconnect the inner ring and segment 91, windings 78 and 65 are deenergized, while windings 79 and 66 are energized, causing armatures 81 and 63 to make with contacts 83 and 68, respectively. Positive battery is therefore applied to counter 84, causing the count thereof to advance one digit. Alternating current from source PL is applied to the cable circuit through contact 68 and armature 63, the number of cycles applied being sufficient to operate switch 21 at the repeater. As soon as brushes 93 again contact segment 90, windings 79 and 66 become deenergized and windings 78 and 65 become energized, returning the circuit to its previous condition. The operations described could have been controlled manually by placing switch 87 in its right hand position and using switch 105 selectively to energize windings 78 and 65 and 79 and 64.

After the completion of the operations set forth, tongue 20 of switch 21 at the repeater will be made with contact 19, placing D. C. stepping magnet 17 across the cable circuit. Switch 73 should now be moved to its right hand position so that D. C. stepping pulses instead of A. C. switching pulses will be sent out over the cable. It should be noted that the D. C. testing pulses transmitted through ammeter 70 are much lower in magnitude than the D. C. stepping pulses so that the D. C. testing pulses will not operate magnet 17.

If switch 87 is in its left hand position, switch 97 may be operated to its bottom position, initiating the sequence of operations described above. However, in this case a D. C. stepping pulse instead of an A. C. switching pulse will be transmitted. The operation is repeated until the desired number of steps of switch S at the repeater have been achieved. At this time switch 73 is again returned to its left hand position and switch 97 operated to send out the train of A. C. switching pulses necessary to operate switch 21 back to contact 25. Plug 62 may now be connected to amplifier and power supply 60 or to a testing position (not shown).

Since the duration of the train of A. C. switching pulses is relatively critical, it is advisable that distributor 92 be employed for proper timing. For D. C. stepping, however, manual switch 105 may be used for faster operation. With switch 87 in its right hand position, operation of switch 105 to its upper position will cause energization of windings 79 and 64, while operation of switch 105 to its lower position will cause energization of windings 78 and 65.

Each time a D. C. stepping pulse or a train of A. C. switching pulse cycles is transmitted over the cable, counter 84 is caused to advance a digit. The reading of counter 84 is therefore an indication of the switching position attained at the repeater. However, if a transmitted pulse does not produce the desired switching or stepping operation, because of the action of earth currents, sluggish operation of the repeater equipment or from other causes, the counter indication will be erroneous. More precise determination of the switching position achieved will be obtained by operating switch 21 to contact 25 and observing the deflection on meter 76. For instance, if open indications are produced six steps apart, the sixth step will correspond to studs 10 of switch S. If the open indications are four steps apart, the fourth step will correspond to studs 4 of switch S.

It is evident that the circuit arrangement described could be operated with negative potentials instead of the positive potentials described.

While the invention has been described in a specific embodiment thereof and in a specific use, it is not desired that it be limited thereto, for obvious modifications thereof will occur to those skilled in the art without departing from the spirit and scope of the invention as set forth in the appended claims.

What is claimed is:

1. A submersible repeater for incorporation in a submarine cable circuit, comprising an electronic amplifier, a first switching means associated therewith, said first switching means having a plurality of switching positions for selectively providing a plurality of testing, amplifying and operating conditions in said cable circuit, positioning means responsive to positioning pulses received over said cable circuit for operating said first switching means from one to another of said switching positions thereof, second switching means for selectively connecting either said first switching means or said positioning means into said cable circuit, operating means responsive to a switching signal received over said cable circuit for operating said second switching means, and means for permanently connecting said operating means to said cable circuit, said operating means having a high impedance value with respect to intelligence signals received over said cable circuit and a low impedance value with respect to said switching signal.

2. A submersible repeater for incorporation in a submarine cable circuit, comprising first switching means, said first switching means having a plurality of switching positions for selectively providing a plurality of testing and operating conditions in said cable circuit, stepping means responsive to direct current stepping pulses received over said cable circuit for operating said first switching means from one to another of said switching positions thereof, said stepping means being arranged to be selectively disconnected from said cable circuit, second switching means for selectively connecting either said first switching means or said stepping means into said cable circuit, operating means responsive to a train of alternating current switching pulses received over said cable circuit for operating said second switching means, and means for permanently connecting said operating means to said cable circuit, said operating means having a high impedance value with respect to intelligence signals received over said cable circuit and a low impedance value with respect to said switching pulses.

3. A submersible repeater for incorporation in a simplex submarine cable circuit having a receiving cable section and a sending cable section connected, respectively, to a receiving terminal and a sending terminal, comprising first switching means, said first switching means having a plurality of switching positions for selectively providing a plurality of testing and operating conditions in said cable circuit, a stepping magnet responsive to direct current stepping pulses received over said receiving cable section for operating said first switching means from one to another of said switching positions thereof, second switching means for selectively connecting either said first switching means or said stepping means to said receiving cable section, means including an alternating current magnet and being responsive to a predetermined number of alternating current switching pulses received over said receiving cable section for operating said second switching means, and means for permanently connecting said alternating current magnet to said cable circuit, said alternating current magnet having a high impedance value with respect to intelligence signals received over said sending cable section and a low impedance value with respect to said switching pulses.

4. A submersible repeater for incorporation in a submarine cable circuit, comprising a plurality of electronic amplifiers each having an input circuit and an output circuit and each having a tube heater circuit, first switching means, said first switching means having a plurality of switching positions for selectively operatively connecting said electronic amplifiers in said cable circuit and for selectively providing a plurality of testing and operating conditions in said cable circuit, stepping means responsive to stepping pulses received over said cable circuit for operating said first switching means from one to another of said switching positions thereof, said stepping means being arranged to be selectively disconnected from said cable circuit, second switching means for selectively connecting either said first switching means or said stepping means into said cable circuit, operating means responsive to a switching signal received over said cable circuit for operating said second switching means, and means for permanently connecting said operating means to said cable circuit, said operating means having electrical characteristics which render it nonresponsive to intelligence signals received over said cable circuit.

5. A submersible repeater for incorporation in a submarine cable circuit, comprising a plurality of electronic amplifiers having common input circuits and common output circuits and each having a tube heater circuit, first switching means, said first switching means having a plurality of switching positions for selectively operatively connecting said electronic amplifiers in said cable circuit and for selectively providing a plurality of testing and operating conditions in said cable circuit, stepping means responsive to direct current stepping pulses received over said cable circuit for operating said first switching means from one to another of said switching positions thereof, second switching means for selectively connecting either said first switching means or said stepping means into said cable circuit, operating means responsive to a train of alternating current switching pulses received over said cable circuit for operating said second switching means, and means for permanently connecting said operating means to said cable circuit, said operating means having electrical characteristics which render it nonresponsive to intelligence signals received over said cable circuit.

6. A submersible repeater for incorporation in a submarine cable circuit intercoupling a sending terminal and a receiving terminal, comprising a plurality of electronic amplifiers having common input circuits and common output circuits and each having a tube heater circuit, first switching means, said first switching means having a plurality of switching positions for selectively connecting said input and output circuits into said cable circuit, for selectively connecting said tube heater circuits into said cable circuit and for selectively providing a plurality of testing and operating conditions in said cable circuit, a stepping magnet responsive to direct current stepping pulses received over said cable circuit from said receiving terminal for operating said first switching means from one to another of said switching positions thereof, second switching means for selectively connecting either said first switching means or said stepping magnet to said cable circuit, operating means including an alternating current magnet and being responsive to a predetermined number of alternating current switching pulses received over said cable circuit from said receiving terminal for operating said second switching means, and means for permanently connecting said alternating current magnet to said cable circuit, said alternating current magnet having a high impedance value with respect to intelligence signals received over said cable circuit from said sending terminal and a low impedance value with respect to said alternating current switching pulses.

7. A submarine cable circuit, comprising a submersible repeater interposed in a submerged portion of said cable circuit and including first switching means, said first switching means having a plurality of switching positions for selectively providing a plurality of testing and operating conditions in said cable circuit, stepping means responsive to stepping pulses received over said cable circuit for operating said first switching means from one to another of said switching positions thereof, second switching means for selectively connecting either said first switching means or said stepping means into said cable circuit, operating means responsive to a switching signal received over said cable circuit for operating said second switching means and means for permanently connecting said operating means to said cable circuit, said operating means having electrical characteristics rendering it nonresponsive to intelligence signals received over said cable circuit, and a shore station comprising intelligence signaling apparatus, control signaling apparatus and means for connecting either said intelligence signaling apparatus or said control signaling apparatus into said cable circuit, said control signaling apparatus comprising a switching circuit including third switching means for applying either said stepping pulses or said switching signal to said cable circuit.

8. A submarine cable circuit, comprising a submersible repeater interposed in a submerged portion of said cable circuit and including first switching means, said first switching means having a plurality of switching positions for selectively providing a plurality of testing and operating conditions in said cable circuit, stepping means responsive to stepping pulses received over said cable circuit for operating said first switching means from one to another of said switching positions thereof, said stepping means being arranged to be selectively disconnected from said cable circuit, second switching means for selectively connecting either said first switching means or said stepping means into said cable circuit, operating means responsive to a switching signal received over said cable circuit for operating said second switching means and means for permanently connecting said operating means to said cable circuit, said operating means having electrical characteristics rendering it nonresponsive to intelligence signals received over said cable circuit, and a shore station comprising intelligence signaling apparatus, control signaling apparatus and means for connecting either said intelligence signaling apparatus or said control signaling apparatus into said cable circuit, said control signaling apparatus comprising a testing circuit for applying a testing current to said cable circuit, a switching circuit including third switching means for applying either said stepping pulses or said switching signal to said cable circuit and fourth switching means for selectively connecting either said testing circuit or said switching circuit into said cable circuit.

9. A submarine cable circuit, comprising a submersible repeater interposed in a submerged portion of said cable circuit and including first switching means, said first switching means having a plurality of switching positions for selectively providing a plurality of testing and operating conditions in said cable circuit, stepping means responsive to direct current stepping pulses received over said cable circuit for operating said first switching means from one to another of said switching positions thereof, second switching means for selectively connecting either said first switching means or said stepping means into said cable circuit, operating means responsive to a predetermined number of cycles of alternating current switching pulses received over said cable circuit for operating said second switching means and means for permanently connecting said operating means to said cable circuit, said operating means having electrical characteristics rendering it nonresponsive to intelligence signals received over said cable circuit, and a shore station comprising intelligence signaling and repeater power supply apparatus, control signaling apparatus and means for connecting either said intelligence signaling and repeater power supply apparatus or said control signaling apparatus into said cable circuit, said control signaling apparatus comprising a testing circuit for applying a testing current to said cable circuit, a switching circuit including third switching means for applying either said direct current stepping pulses or said plurality of cycles of alternating current switching pulses to said cable circuit and fourth switching means for selectively connecting either said testing circuit or said switching circuit into said cable circuit.

10. A submarine cable circuit, comprising a submersible repeater interposed in a submerged portion of said cable circuit and including first switching means, said first switching means having a plurality of switching positions for selectively providing a plurality of testing and operating conditions in said cable circuit, a stepping magnet responsive to direct current stepping pulses received over said cable circuit for operating said first switching means from one to another of said switching positions thereof, second switching means for selectively connecting either said first switching means or said stepping magnet into said cable circuit, operating means responsive to a predetermined number of cycles of alternating current switching pulses received over said cable circuit for operating said second switching means and means for permanently connecting said operating means to said cable circuit, said operating means having electrical characteristics rendering it nonresponsive to intelligence signals received over said cable circuit, and a shore receiving station comprising intelligence receiving and repeater power supply apparatus, control signaling apparatus and means for connecting either said intelligence receiving and repeater power supply apparatus or said control signaling apparatus into said cable circuit, said control signaling apparatus comprising a testing circuit for applying a testing current to said cable circuit, a switching circuit including third switching means for applying either said direct current stepping pulses or said predetermined number of cycles of alternating current switching pulses to said cable circuit and fourth switching means for selectively connecting either said testing circuit or said switching circuit into said cable circuit.

11. Shore station apparatus for use with a submarine cable circuit having a submersible repeater interposed in a submerged portion thereof, comprising intelligence signaling and repeater power supply apparatus, control signaling apparatus, and means for connecting either said intelligence signaling and repeater power supply apparatus or said control signaling apparatus to said cable circuit, said control signaling apparatus comprising a testing circuit for applying a testing current to said cable circuit, a switching circuit including first switching means for applying either stepping pulses or a switching signal to said cable circuit, second switching means for selectively connecting either said testing circuit or said switching circuit into said cable circuit, and third switching means adapted to control the said second switching means.

12. Receiving shore station apparatus for use with a submarine cable circuit having a submersible repeater interposed in a submerged portion thereof, comprising intelligence receiving and repeater power supply apparatus, and means for connecting either said intelligence receiving and repeater power supply apparatus or said control signaling apparatus to said cable circuit, said control signaling apparatus comprising a testing circuit for applying a testing current to said cable circuit, a switching circuit including first switching means for applying either direct current stepping pulses or a predetermined number of cycles of alternating current switching pulses to said cable circuit, second switching means for selectively connecting either said testing circuit or said switching circuit into said cable circuit, and third switching means coupled to said second switching means, whereby control signals are applied to the cable circuit for a predetermined period of time.

13. A submarine cable circuit, comprising a submersible repeater interposed in a submerged portion of said cable circuit and including first switching means, said first switching means having a plurality of switching positions for selectively providing a plurality of testing and operating conditions in said cable circuit, stepping means responsive to stepping pulses received over said cable circuit for operating said first switching means from one to another of said switching positions thereof, second switching means for selectively connecting either said first switching means or said stepping means into said cable circuit, operating means responsive to a switching signal received over said cable circuit for operating said second switching means and means for permanently connecting said operating means to said cable circuit, said operating means having electrical characteristics rendering it nonresponsive to intelligence signals received over said cable circuit, and a shore station comprising intelligence signaling apparatus, control signaling apparatus and means for connecting either said intelligence signaling apparatus or said control signaling apparatus into said cable circuit, said control signaling apparatus comprising a testing circuit for applying a testing current to said cable circuit and including means for indicating the connection provided by said second switching means and the switching position of said first switching means, a switching circuit including third switching means for applying either said stepping pulses or said switching signal to said cable circuit and fourth switching means for selectively connecting either said testing circuit or said switching circuit into said cable circuit.

14. A submarine cable circuit, comprising a submersible repeater having a plurality of amplifier circuits and being interposed in a submerged portion of said cable circuit and including first switching means, said first switching means having a plurality of switching positions for selectively providing a plurality of testing, amplifying and operating conditions in said cable circuit, stepping means responsive to stepping pulses received over said cable circuit for operating said first switching means from one to another of said switching positions thereof, second switching means for selectively connecting either said first switching means or said stepping means into said cable circuit, operating means responsive to a switching signal received over said cable circuit for operating said second switching means and means for permanently connecting said operating means to said cable circuit, said operating means having electrcal characteristics rendering it nonresponsive to intelligence signals received over said cable circuit, and a shore station comprising intelligence signaling apparatus, control signaling apparatus and means for connecting either said intelligence signaling apparatus or said control signaling apparatus into said cable circuit, said control signaling apparatus comprising a testing circuit for applying a testing current to said cable circuit and including a current meter for indicating the connection provided by said second switching means and the switching position of said first switching means, a switching circuit including third switching means for applying either said stepping pulses or said switching signal to said cable circuit and fourth switching means for selectively connecting either said testing circuit or said switching circuit into said cable circuit.

15. A shore station for use with a submarine cable circuit having a submersible repeater interposed in a submerged portion thereof and including switching apparatus having a plurality of switching positions, comprising intelligence signaling apparatus, control signaling apparatus, and means for connecting either said intelligence signaling apparatus or said control signaling apparatus to said cable circuit, said control signaling apparatus comprising a testing circuit for applying a testing current to said cable circuit and including counting means for indicating the switching position of the switching apparatus of said submersible repeater, a switching circuit including first switching means for applying either stepping pulses or a switching signal to said cable circuit and second switching means for selectively connecting either said testing circuit or said switching circuit into said cable circuit.

FAY B. BRAMHALL.
EARL L. NEWELL.
PHILIP H. WELLS.
CLIFFORD H. CRAMER.

References Cited in the file of this patent

UNITED STATES PATENTS

| Number | Name | Date |
|---|---|---|
| 1,901,185 | Nelson | Mar. 14, 1933 |
| 2,020,318 | Jacobs | Nov. 12, 1935 |
| 2,338,872 | Robidoux | Jan. 11, 1944 |
| 2,396,914 | Cook | Mar. 19, 1946 |